United States Patent [19]

Marston et al.

[11] 3,887,457
[45] June 3, 1975

[54] MAGNETIC SEPARATION METHOD

[75] Inventors: Peter G. Marston, Gloucester; Ionel Wechsler, Farmingham; John J. Nolan, Randolph, all of Mass.

[73] Assignee: Magnetic Engineering Associates Inc., Cambridge, Mass.

[22] Filed: May 21, 1973

[21] Appl. No.: 362,218

[52] U.S. Cl. ............... 209/214; 209/223; 209/232; 210/222
[51] Int. Cl. .............................................. B03c 1/24
[58] Field of Search .......... 209/227, 214, 222, 223, 209/232; 210/222, 223

[56] References Cited
UNITED STATES PATENTS

| | | | |
|---|---|---|---|
| 1,417,189 | 5/1922 | McCarthy | 209/227 X |
| 1,564,732 | 12/1925 | Weatherby | 209/227 X |
| 1,605,117 | 11/1926 | Koizumi | 209/227 X |
| 3,279,602 | 10/1966 | Kottenstette | 209/214 |
| 3,294,237 | 12/1966 | Weston | 209/227 X |
| 3,375,925 | 4/1968 | Carpenter | 209/222 X |
| 3,552,564 | 1/1971 | Burgener | 209/223 X |
| 3,627,678 | 12/1971 | Marston | 210/222 X |
| 3,676,337 | 7/1972 | Kolm | 210/223 X |

*Primary Examiner*—Robert Halper
*Attorney, Agent, or Firm*—Joseph S. Iandiorio

[57] ABSTRACT

A method of separating more-magnetic particles from less-magnetic particles contained in a fluid medium submitted to a ferromagnetic matrix having a multiplicity of collection sites subject to an applied magnetic field of a predetermined intensity including: providing an applied magnetic field of predetermined field intensity in the matrix to induce high magnetic field gradients at the collection sites and to induce magnetic dipole moments in the more-magnetic particles to adhere the more-magnetic particles having induced magnetic dipole moments to the collection sites having high magnetic field gradients, some of the less-magnetic particles being entrapped between two or more more-magnetic particles or between one or more more-magnetic particles and a collection site; and periodically decreasing the intensity of the magnetic field below the predetermined intensity to reduce the induced high magnetic gradients at the collection sites, and to reduce the induced magnetic dipole moments in the more-magnetic particles below the level required for the more-magnetic particles to adhere to each other and to the collection sites to free entrapped less-magnetic particles, and then increasing the intensity of the magnetic field, at a rate of at least one cycle of the magnetic field per matrix transit period.

6 Claims, 9 Drawing Figures

MAGNETIC SEPARATION METHOD

FIELD OF INVENTION

This invention relates to a method of magnetically separating more-magnetic particles from less-magnetic particles using a magnetic field of periodically varying intensity during the feed stage and/or the rinse stage of the separation.

BACKGROUND OF INVENTION

In certain types of magnetic separation techniques the material to undergo separation is submitted in a slurry to a high intensity magnetic field in a ferromagnetic matrix having a multiplicity of collection sites and high field gradients. The slurry contains more-magnetic and less-magnetic particles which are to be separated; either one or both types of particles may be the desired product. In the feed stage the magnetic field intensity is set at a level at which the more-magnetic particles adhere to the collection sites and the less-magnetic particles do not. Following the feed stage there is a flush stage in which a cleansing fluid, e.g., clear water or the slurry having a reduced concentration, is passed through the matrix with the field turned off to wash out the more-magnetic particles that adhered to the matrix when the field was on. There may be another stage, a rinse stage, before the flush stage in which a similar cleansing fluid is passed through the matrix with the field still on. The magnetic field is provided by a direct current coil which is switched on during the feed (and rinse) stages and off during the flush stage. In one conventional system, U.S. Pat. Nos. 3,676,337 and 3,567,026, an alternating current of diminishing magnitude is applied to the coil following the turning off of the direct current during the flush stage to further demagnetize the matrix and recover more of the more-magnetic particles; alternating current is also applied to physically vibrate the matrix and shake loose more of the more-magnetic particles during the flush stage.

These techniques however only serve to achieve more complete removal of the more-magnetic particles from the matrix during the flush stage. They do nothing to improve the quality or completeness of the particle separation which occurs principally during the feed and partially during the rinse stages. One of the shortcomings of the conventional separation device is that during the separation stages (feed and rinse) the more-magnetic particles, having induced dipole moments, will adhere not only to the collection sites but to each other as well. As the more-magnetic particles magnetically flocculate they may mechanically entrap less-magnetic particles. Similarly less-magnetic particles may be entrapped between the more-magnetic particles and the collection sites.

Thus, even using these conventional techniques the separation achieved is not sufficient for certain separation processes. For example, in the beneficiation of iron ore, silica is one of the more important gangue materials. The silicon dioxide content of the ore has a great influence on the amount of slag generated during the iron (and steel) making process. A decrease of approximately 1.5% of the silicon dioxide content of an ore will produce a drop in slag of approximately 143 pounds per long ton of pig iron, and there are indications that a saving of approximately 66 pounds of coke for each 220 pounds of reduction in slag can be had. Recent indications suggest that steel making may be achieved more economically by using a combination of a pre-reduction furnace and an electric steel making furnace rather than through the use of new blast furnace constructions. Supergrade (very low silica) concentrates would be the first step in developing such a technology which circumvents the use of the blast furnace. The development of successful techniques for producing supergrade concentrates may also find application in conventional blast furnace operations as the need for increasing the grade of domestic ore concentrates becomes increasingly urgent in the face of high grade imports. The beneficiation of low grade iron ores is being accomplished using a number of different techniques, see U.S. Pat. Nos. 3,337,228 and 3,502,271 including washing, jigging, heavy media separation, flotation and magnetic separation. Ore concentrates thus obtained typically contain from 62 – 69% of iron and between 5 – 10% of silicon dioxide. Attempts to raise magnetite ores to supergrade concentrates has resulted in a number of techniques most of which involve flotation steps. A typical procedure requires costly scrubbing followed by flotation, magnetic separation and then screening. A supergrade concentrate obtained by this procedure includes from 1.3 to 2% silica and yields a total iron recovery between 70 and 95%. However, the technique requires very large amounts of water, tends to pollute the water with chemicals and has a relatively high overall process cost.

SUMMARY OF INVENTION

It is therefore an object of this invention to provide an improved, more similified, less expensive method of magnetically separating more-magnetic from less-magnetic particles.

It is a further object of this invention to provide such a method of magnetic separation which reduces the mechanical entrapment of less-magnetic particles.

It is a further object of this invention to provide such a method of magnetic separation which uses a time varying magnetic field applied to the matrix during separation in the feed stage and/or rinse stage to winnow or free entrapped less-magnetic particles.

It is a further object of this invention to provide such a method of magnetic separation for producing a higher grade concentration of iron ore than conventional devices without the aid of additional concentration techniques.

It is a further object of this invention to provide such a method of magnetic separation which provides capability of greater matrix loading in a given matrix.

This invention results from the realization that a certain amount of mechanical entrapment occurs in a magnetic separation process whereby a significant portion of the less-magnetic particles which are not sufficiently magnetic to adhere to the matrix collection sites are nevertheless entrapped in the matrix because they are caught and held between two or more more-magnetic particles which are attracted and held to a collection site or are caught and held between a more-magnetic particle and a collection site and that these entrapped less-magnetic particles could be freed, improving the quality of separation of the particles, by applying, during the feed and/or rinse stage, a time varying magnetic field whose intensity varies periodically from a level sufficient to attract the more-magnetic but not the less-magnetic particles to collection sites to a level insufficient to attract either type of particles and achieve de-flocculation of the more-magnetic particles, one or more times during the transit period required for a particle to travel through the matrix.

The invention is accomplished by a method of separating more-magnetic particles from less-magnetic particles contained in a fluid medium submitted to a ferromagnetic matrix under the influence of an applied magnetic field having a predetermined intensity. The method includes submitting a slurry to undergo separation including both the more-magnetic and the less-magnetic particles to a ferromagnetic matrix having a multiplicity of collection sites and providing an applied magnetic field having a predetermined field intensity in the matrix to induce high magnetic field gradients at the collection sites and to induce magnetic dipole moments in the more-magnetic particles in order to adhere the more-magnetic particles to the collection sites. Some of the less-magnetic particles are entrapped between two or more more-magnetic particles, others between one or more of the more-magnetic particles and a collection site. The intensity of the magnetic field is periodically varied to reduce the induced high magnetic field gradients at the collection sites and to reduce the induced magnetic dipole moments in the more-magnetic particles below the level required for the more-magnetic particles to adhere to each other and to the collection sites and thereby free the entrapped less-magnetic particles and then re-establishing a magnetic field of the predetermined intensity at a rate of at least one cycle of the magnetic field per matrix transit period. Instead of a single periodic current used to energize the coil in the magnetic separator a multiphase periodic current source may be used such as a three-phase AC supply, so that the time varying (e.g., AC) magnetic field is constantly changing its direction. In a single phase, stationary field system a collection site appears at a particular point and is either energized or deenergized, on or off, at that point depending upon the intensity of the single phase field. However, in a multiphase system a collection site is turned off or deenergized, not by the fact that the field intensity has been decreased but by the fact that the field direction has changed, so that although that particular collection site ceases to function as a result of the field assuming a new direction, a neighboring point, now subject to the field in its new direction will host a new collection site.

DISCLOSURE OF PREFERRED EMBODIMENT

Other objects, features and embodiments will occur from the following description of a preferred embodiment and the accompanying drawings, in which.

The invention may be accomplished by supplying a slurry containing more-magnetic particles and less-magnetic particles which are to be separated to a ferromagnetic matrix which may be formed of balls, tacks, expanded metal, steel wool or the like. The matrix is enclosed in a canister which receives the slurry preferably through an inlet pipe and a number of inlets and emits it through a number of outlets into an outlet pipe. Low conductance materials are used in the canister and plumbing located within the magnetic frame to ensure that there exists no shorted turn which would effectively short circuit the time varying magnetic field. The canister is surrounded by a magnet coil and the coil and canister both may be enclosed in a ferromagnetic return frame which may be laminated to reduce eddy currents. The magnetic coil may be energized by any suitable source of time varying current such as an alternating current power source, pulsating DC source or any other source which will cause the magnetic field to periodically switch from a higher intensity to a lower intensity one or more times during the transit period of a particle. The transit period is defined as the time it takes a more-magnetic or less-magnetic particle to move through the matrix from the inlet to the outlet with the field deenergized. Thus the frequency or period of the alternating field is such that a particle moving through the matrix will experience at least one cycle of change in field intensity during its travel through the matrix. Typically a transit time or period is at least ten times the period of the time varying alternating field and in practice it is often convenient to use readily available 50 or 60 Hertz AC.

Figure 1:
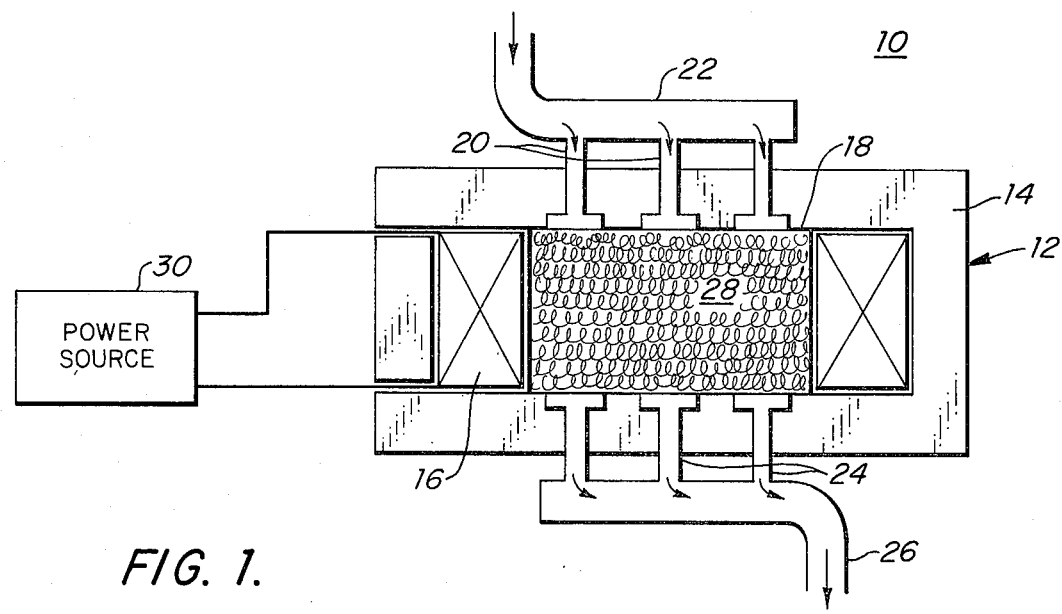
FIG. 1 is a diagrammatic, cross-sectional, elevational view of a magnetic separator which may be used to perform the method of this invention.

There is shown in FIG. 1 a magnetic separator 10 which may be used to carry out the method of this invention. Separator 10 includes a ferromagnetic return frame 12 formed of a plurality of laminations 14 and in which is contained coil 16 surrounding canister 18. Canister 18 is fed through inlets 20 from inlet pipe 22 and its output is collected by outlets 24 and outlet pipe 26. Canister 18 contains a magnetic matrix 28 formed, for example, of steel wool. Coil 16 is energized by time varying or periodic current which may be pulsating DC, AC or any other periodic sinusoidal or non-sinusoidal wave form supplied by power source 30 which may contain power factor correction capacitors.

Figure 2:
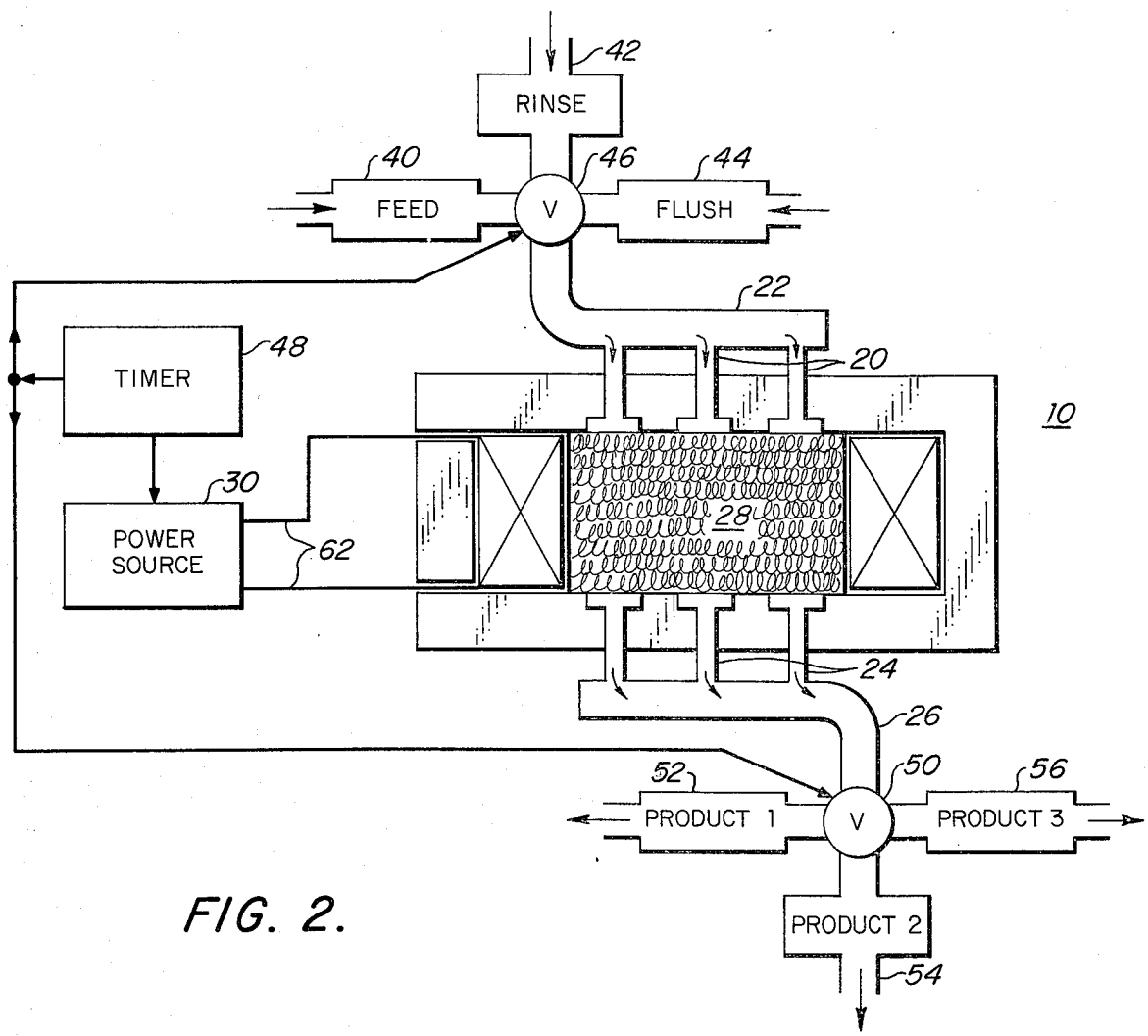
FIG. 2 is a schematic diagram of a system for controlling the timing of the feed, rinse and flush stages of a magnetic separator.

In operation, FIG. 2, where like parts have been given like reference numbers, device 10 is typically operated in three stages: a feed stage, a rinse stage and a flush stage. Inlet pipe 22 may selectively receive three separate inputs: a feed input 40, rinse input 42 and flush input 44 under the supervision of solenoid valve 46 which is controlled by timer 48. During the feed stage the slurry submitted to separator 10 typically includes a combination of the more-magnetic particles and the less-magnetic particles to be separated contained in a fluid medium. In the rinse stage separator 10 receives either a less concentrated solution of slurry than submitted during the feed stage or a clear rinsing fluid such as water. During the flush stage, generally, a cleansing fluid such as water is used. The duration of the feed stage, rinse stage and flush stage depends in part upon the magnitude of the slurry flow per unit of time, the materials to be separated, matrix material and dimensions and the magnetic field intensity as well as the desired separation to be obtained. Simultaneously with the control of valve 46 timer 48 controls valve 50 which selects the designation of the output of separator device 10 as either product one 52, product two 54 or product three 56. During the feed stage, timer 48 also delivers a periodic current from power source 30 over lines 62 to the coil in magnetic separator 10. The coil is thus energized during the feed and rinse stages and deenergized during the flush stage.

Figures 3A, 3B, 3C:
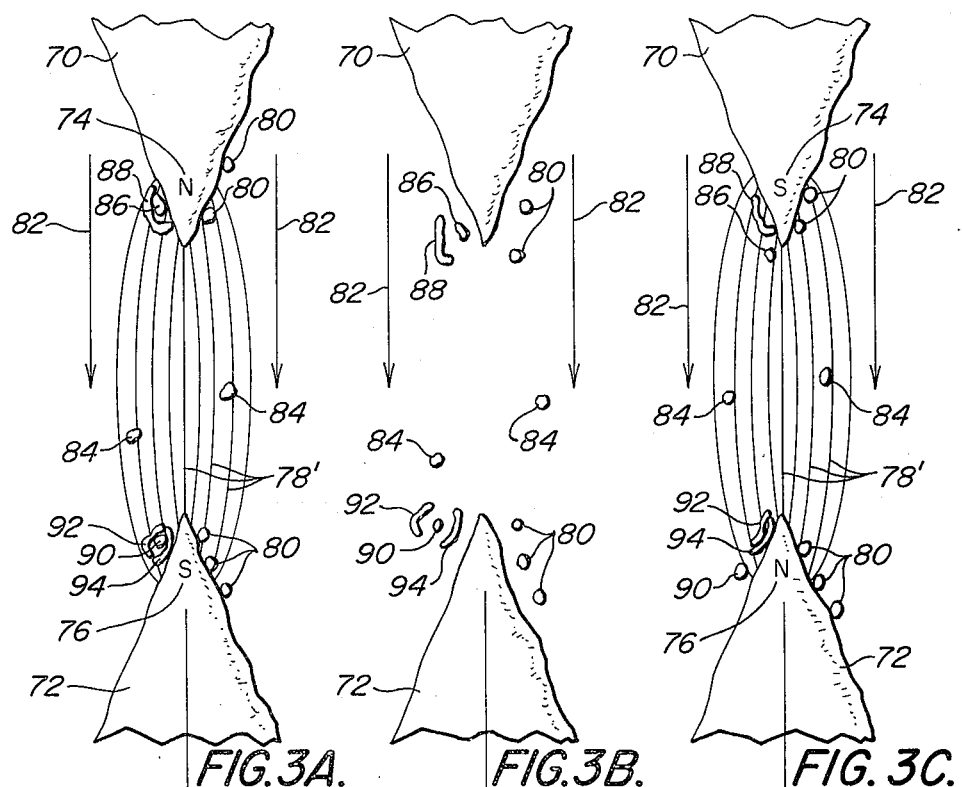
FIG. 3 is a diagrammatic, elevational view of a pair of points in a magnetic matrix at three different times A, B, C in a cycle of operation relative to the applied vertical magnetic field D.
Figure 3D:
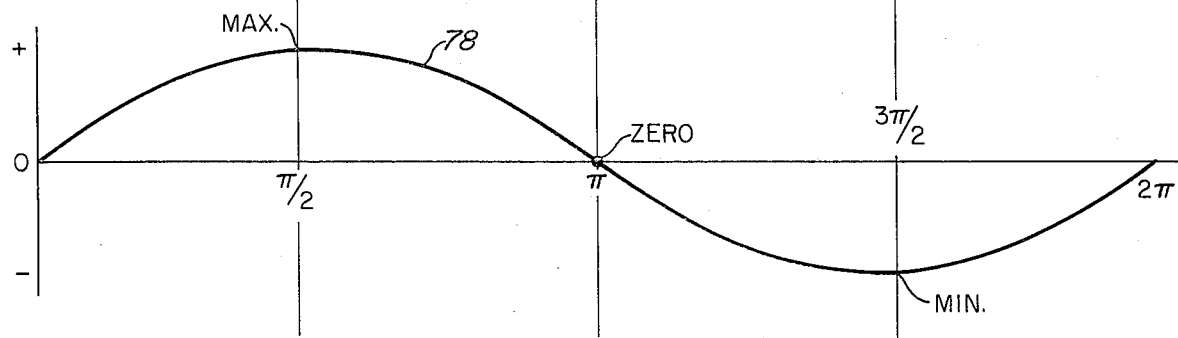

The improved method of separating more-magnetic particles from less-magnetic particles according to this invention which frees less-magnetic particles entrapped by more-magnetic particles or more-magnetic particles and the collection sites is shown in FIG. 3 with respect to termini or discontinuous points 70, 72 on the steel wool of matrix 28, FIG. 1. This capturing of the less-magnetic particles is referred to as mechanical entrapment. FIGS. 3A, 3B and 3C show the conditions of the more-magnetic and less-magnetic particles at the points 70, 72 during the maximum, zero and minimum conditions, respectively, of a sinusoidally varying magnetic field 78, FIG. 3D. As previously indicated, neither the energizing current nor the resulting magnetic field need be sinusoidal.

Initially, at the time depicted in FIG. 3A, the magnetic field 78, indicated by lines 78', FIG. 3A, induced in the steel wool matrix is a maximum. At this time, too, the magnetic field gradient between collection sites 74 and 76 is at a maximum and the particles in the field have dipole moments induced in them. There are a number of more-magnetic particles 80 attracted and held by the high field gradients at collection sites 74 and 76 by virtue of their induced dipole moments, against the flow, indicated by arrows 82, of slurry past those collection sites. The less-magnetic particles 84 having lesser induced dipole moments are not sufficiently attracted to the collection sites 74, 76 and move through the magnetic field past the collection sites. However, certain of the less-magnetic particles, such as particle 86, may become entrapped between a more-magnetic particle 88 and a portion of collection site 74. Alternatively, a less-magnetic particle 90 may become trapped between two or more more-magnetic particles 92, 94 which are attracted and held by collection site 76. Because of this action, termed a mechanical entrapment these less-magnetic particles 86 and 90, which should pass through the matrix as do less-magnetic particles 84 will be retained with the more-magnetic particles 88, 92 and 94 and will be removed from the matrix during the flushing stage whereby their presence will reduce the quality of the separation.

However, FIG. 3B, when the magnetic field 78 goes to zero, collection sites 74 and 76 on points 70 and 72 disappear and the attraction for magnetic particles 80 as well as magnetic particles 88, 92 and 94 is no longer present. Under these conditions, where more-magnetic particles 88, 92 and 94 are not tightly held to their respective collection sites, the force of the flow indicated by arrows 82 may act to remove the less-magnetic particle 86 from between more-magnetic particle 88 and collection site 74 and to remove less-magnetic particle 90 from between the more-magnetic particles 92 and 94.

Thus, following this, FIG. 3C, when the magnetic field reaches a minimum, FIG. 3D, i.e., the field direction is reversed and collection site 76 becomes a north pole and collection site 74 becomes a south pole, more-magnetic particles 80, 88, 92 and 94 once again are attracted and held to the collection sites. However, the previously entrapped less-magnetic particles 86 and 90 have escaped the location wherein they had been entrapped and are now free to move in the direction of the flow, indicated by arrows 82, along with the other less-magnetic particles 84. This action continues one or more times, and preferably a number of times, during the transit time of an average particle. The transit period is defined as the time it takes an average particle to move through the matrix in the absence of a magnetic field.

The variation of the magnetic field intensity varies the field gradient at the collection sites and operates to produce a winnowing effect which enables the less-magnetic particles to escape mechanical entrapment by the more-magnetic particles and so substantially increases the quality of the separation. More-magnetic particles may migrate from one collection site to another in the matrix during the field reversal and are not necessarily always associated with a single collection site as shown in the simplified illustrative example in FIG. 3. Although the field intensity is shown, FIG. 3D, as being symmetrical about zero, this is not a necessary limitation.

Figure 4:
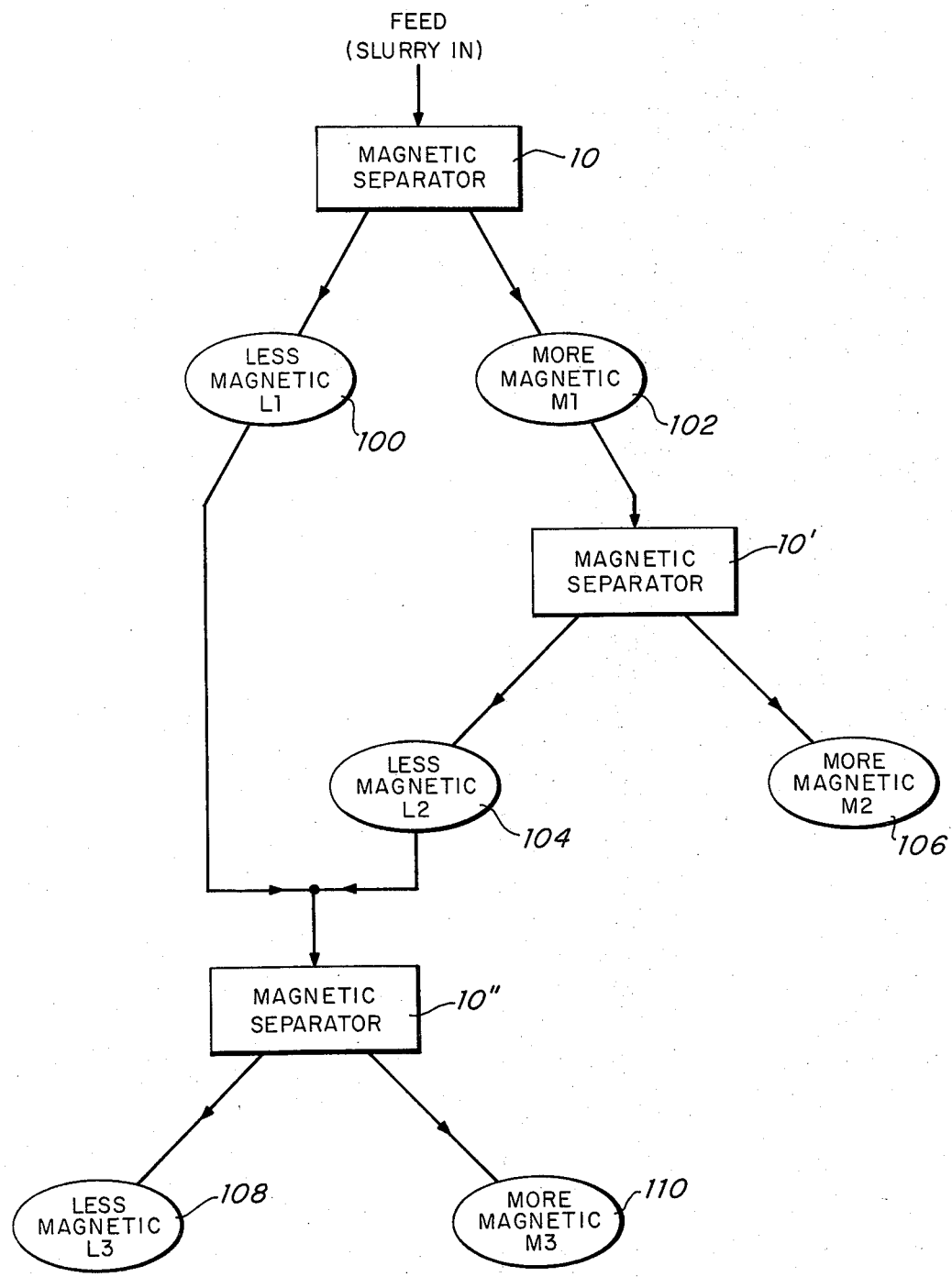
FIG. 4 is a flow chart showing a three-part magnetic separation technique using the method of this invention.

In specific simulation of an actual production system, the fluid medium is water, the more-magnetic particles are magnetite particles, the less-magnetic particles are silica particles, the magnetic field intensity is 350 gauss RMS energized with a current having an approximately sinusoidal wave form at 60 cycles per second and the transit time is approximately 1 second. In one arrangement, as shown in FIG. 4, the slurry is introduced into the magnetic separator 10 which produces two outputs: a first less-magnetic fraction 100 and a first more-magnetic fraction 102. The first more-magnetic fraction 102 is then directly submitted to a second magnetic separator 10' which produces a second less-magnetic fraction 104 and a second more-magnetic fraction 106. The combination of the second less-magnetic fraction 104 and the first less-magnetic fraction 100 is then submitted to a third separator 10" which produces a third less-magnetic fraction 108 and a third more-magnetic fraction 110. In practice magnetic separators 10, 10' and 10" may all be the same physical device with the various more-magnetic and less-magnetic fractions resubmitted. The input (feed) consists of 69.45 percent by weight Fe and 4.97 percent $SiO_2$ with the balance primarily oxygen. The quality of the three outputs i.e., the second more-magnetic fraction 106 ($M_2$), the third more-magnetic fraction ($M_3$) and third less-magnetic fraction ($L_3$) is shown infra in Table 1:

TABLE 1

| | All percentages by Weight | | | | |
|---|---|---|---|---|---|
| Output | % Total Output | % Fe | % $SiO_2$ | % Original (Fe Recovery) | % Original ($SiO_2$ Recovery) |
| $M_2$ | 79.5 | 72.6 | 1.9 | 82.5 | 30.4 |
| $M_3$ | 15.5 | 67.7 | 5.4 | 15.0 | 16.9 |
| $L_3$ | 5.0 | 34.6 | 52.3 | 2.5 | 52.7 |

Figure 5:
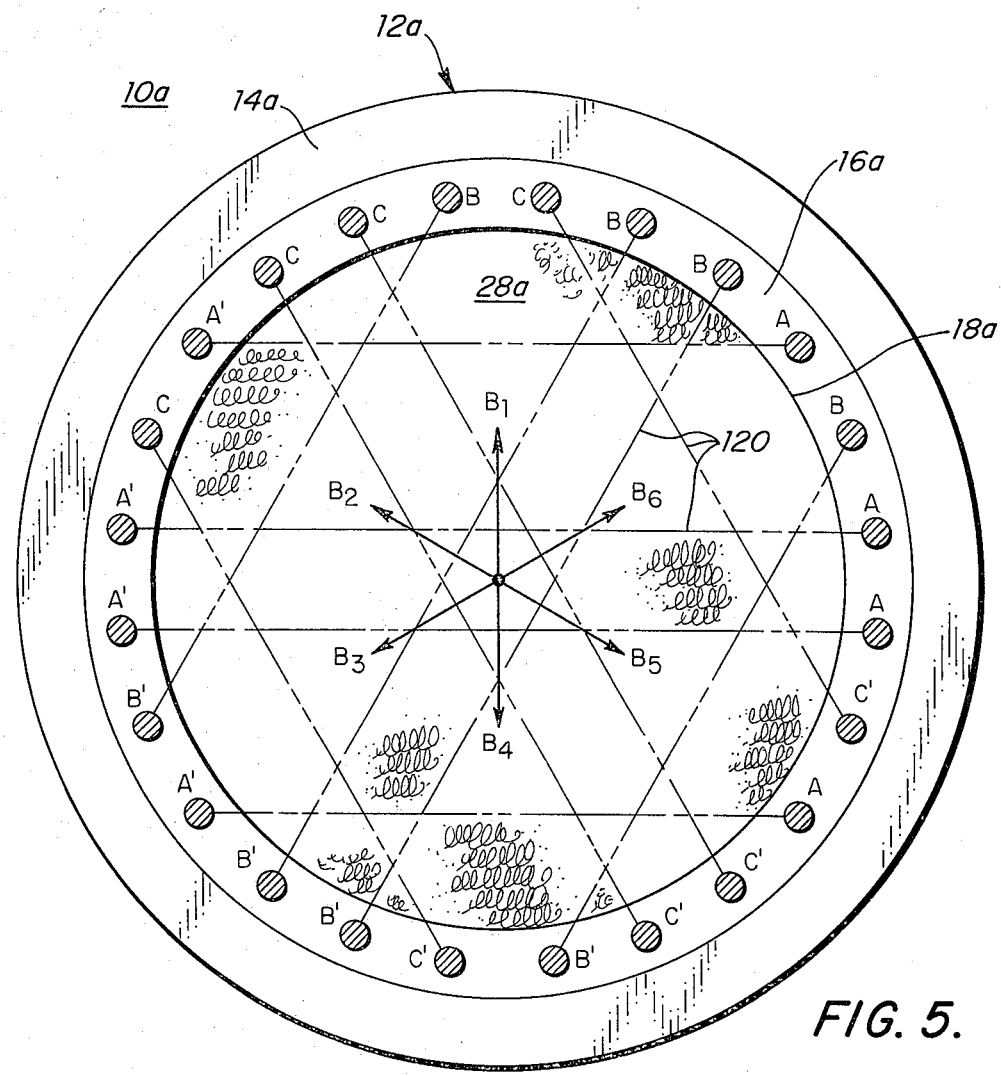
FIG. 5 is a diagrammatic, cross-sectional, plan view showing schematically, coil placement and variations in the magnetic field direction in a multi-phase magnetic separator which may be used to practice the method of this invention.
Figure 6:
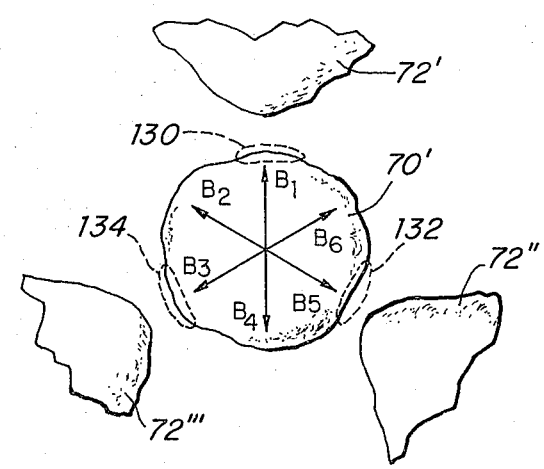
FIG. 6 is a diagrammatic top plan view of a point in a magnetic matrix subject to a rotating horizontal magnetic field.

Although the method of separation according to this invention has been described thus far with respect to single phase energization, this is not a necessary limitation of the invention. For example, the magnet coil may be a multiphase coil to accomodate two-phase, three-phase or any number of phases. A sectional plan view of a mutiphase magnetic separator similar to that shown in FIG. 1, is shown in FIG. 5 where like parts have been given like numbers followed by a lower case a. In FIG. 5 multi-phase magnetic separator 10a includes a laminated ferromagnetic return frame 12a formed from laminations 14a. Frame 12a surrounds multiphase coil 16a within which is located canister 18a containing steel wool matrix 28a. Coil 16a is a three-phase coil having three sets of segments A, A'; B, B'; C, C'. The segments are shown interconnected by dashed lines 120, FIG. 5, such that when the current in A or B or C is positive or moving in the direction into the paper the current in A' or B' or C', respectively, is negative and moves out of the paper. Assuming a sinusoidal time variation and a current maximum in the coil A at the zero with B following A in phase, followed by C the applied magnetic field will rotate to assume the direction indicated by the arrow $B_1$ at time $T = $ Zero, the direction $B_2$ at time $T = \Delta t$; $B_3$ at time $T = 2\Delta t$, etc., to $B_6$ to time $T = 5\Delta t$ and finally back to $B_1$ at time $T = 6\Delta t$, and so continuing until it becomes time to flush the matrix. In a multiphase system, in contrast to a single phase system, there may be a number of collection sites occurring successively on each terminus or point so that where a given matrix may have a certain predetermined number of collection sites when operated in a DC or single phase mode it may have many more such collection sites by virtue of the rotating magnetic field produced by the multi-phase operation. For example, a single terminus or point 70', FIG. 6, similar to point 70, FIGS. 3A, B and C, may contain a first collection site 130 adjacent point 72' under the influence of field $B_1$, $B_4$ a second collection site 132 adjacent point 72'' under the influence of field $B_2$, $B_5$ and a third collection site 134 adjacent point 72''' under the influence of field $B_3$, $B_6$. Thus, varying the direction of the applied magnetic field, at more or less constant intensity, there will be some shifting of collection site locations plus some creation of new sites, at new locations, and destruction of old sites. The more-magnetic particles will shift in response to the shifts in collection site locations. Some less-magnetic particles, previously entrapped by these more-magnetic particles, will thereby be reintroduced into the fluid stream and swept from the matrix volume by the fluid stream. Because each of the available points provided by a magnetic matrix may host a number of collection sites, the matrix may be much more fully utilized for attracting and holding the more-magnetic particles. The matrix loading i.e., quantity of more-magnetic particles that can be held before a flush stage is required, is increased. This generally increases the production capacity of a given matrix. A similar effect could be achieved by providing relative rotation between a single phase field and a matrix.

Although the method of this invention has been described with reference to static devices which operate cyclically to feed, rinse and flush and this is not a necessary limitation of the invention. For example, in certain moveable matrix devices such as disclosed in U.S. Patent application Ser. No. 338,176; filed: Mar. 5, 1973; Marston et al.; MOVING MATRIX MAGNETIC SEPARATOR, the method of this invention may be used by providing the time varying magnetic field continually at a feed station through which the moving matrix periodically passes and not providing any magnetic field at the flush station through which the moving matrix also passes periodically after passing through a feed station.

Other embodiments will occur to those skilled in the art and are within the following claims:

What is claimed is:

1. An improved method of separating more-magnetic particles from less-magnetic particles contained in a fluid medium which reduces mechanical entrapment of less-magnetic particles by more-magnetic particles comprising:

submitting a fluid medium containing both more-magnetic particles and less-magnetic particles to a ferromagnetic matrix having a multiplicity of collection sites; and simultaneously subjecting the more-magnetic particles and the less-magnetic particles, as they move through said matrix, to a time varying magnetic field whose intensity in said matrix varies, from a predetermined intensity sufficient to induce a high magnetic field gradients at said collection sites and to induce magnetic dipole moments in the more-magnetic particles to adhere the more-magnetic particles having induced magnetic dipole moments to said collection sites having high magnetic field gradients, some of the less-magnetic particles being entrapped between two or more more-magnetic particles or between one or more more-magnetic particles and a said collection site, to a lower intensity sufficient to reduce the high magnetic field gradients induced at said collection sites and reduce the induced magnetic dipole moment in said more-magnetic particles below the level required for said more-magnetic particles to adhere to each other and to said collection sites to free entrapped less-magnetic particles;

said time varying magnetic field reaching said predetermined intensity at a collection site more than once and decreasing below that predetermined intensity at least once during each matrix transit period during which more-magnetic and less-magnetic particles are simultaneously being fed to said matrix.

2. The method of claim 1 in which said applied magnetic field is periodic and stationary.

3. The method of claim 2 in which said applied magnetic field periodically reverses polarity.

4. The method of claim 1 in which said slurry to undergo separation includes an iron ore.

5. The method of claim 4 in which the more-magnetic particles include magnetite and the less-magnetic particles include silica.

6. An improved method of separating more-magnetic particles from less-magnetic particles contained in a fluid medium which reduces mechanical entrapment of less-magnetic particles by more-magnetic particles comprising:

submitting a fluid medium containing both more-magnetic particles and less-magnetic particles to a ferromagnetic matrix having a multiplicity of collection sites; and simultaneously subjecting the more-magnetic particles and the less-magnetic particles as they move through said matrix, to a multiphase time varying magnetic field whose direction in said matrix varies and whose intensity varies at a first set of said collection sites in said matrix from a predetermined intensity sufficient to induce high magnetic field gradients at said first set of collection sites and to induce magnetic dipole moments in the more-magnetic particles to adhere said more-magnetic particles having induced magnetic dipole moments to said first set of collection sites having high magnetic field gradients, some of said less-magnetic particles being entrapped between two or more more-magnetic particles or between one or more more-magnetic particles and said first set of collection sites, to a lower intensity sufficient to reduce the high magnetic field gradients induced at said first set of collection sites and reduced the induced magnetic dipole moment in said more-magnetic particles below the level required for said more-magnetic particles to adhere to each other and to said first set of collection sites to free entrapped less-magnetic particles; said time varying multi-phase magnetic field having a change of direction during each matrix transit period sufficient for said field at said first set of collection sites to reach said predetermined intensity and then decrease below said predetermined intensity and subsequent sets of said collection sites reaching said predetermined intensity during subsequent matrix transit periods.

* * * * *